United States Patent
Christian et al.

(10) Patent No.: US 6,505,431 B1
(45) Date of Patent: Jan. 14, 2003

(54) TIP UP DOWNRIGGER ASSEMBLY WITH SAFETY CONFIGURED AND INBOARD POSITIONED CATCH PIN

(75) Inventors: Stewart A. Christian, Traverses City, MI (US); Daniel Daigger, Interlochen, MI (US)

(73) Assignee: Quality Outdoor Products, LLC, Romulus, MI (US)

( * ) Notice: Subject to any disclaimer, the term of this patent is extended or adjusted under 35 U.S.C. 154(b) by 0 days.

(21) Appl. No.: 09/668,807

(22) Filed: Sep. 22, 2000

(51) Int. Cl.[7] ............................................. A01K 97/10
(52) U.S. Cl. ..................... 43/21.2; 43/19.2; 43/43.12
(58) Field of Search ............................... 43/21.2, 27.2, 43/27.4, 43.12, 19.2

(56) References Cited

U.S. PATENT DOCUMENTS

| | | | | |
|---|---|---|---|---|
| 3,968,587 A | * | 7/1976 | Kammeraad | 43/27.4 |
| 4,173,091 A | | 11/1979 | Emory, Jr. | 43/43.12 |
| 4,191,340 A | | 3/1980 | Kubanek | 242/54 R |
| 4,204,356 A | | 5/1980 | Smith | 43/26.1 |
| 4,205,478 A | | 6/1980 | Emory, Jr. | 43/44.85 |
| 4,495,721 A | | 1/1985 | Emory, Jr. | 43/21.2 |
| 4,527,349 A | | 7/1985 | Emory, Jr. | 43/21.2 |
| 4,610,409 A | | 9/1986 | Emory, Jr. | 242/106 |
| 4,798,021 A | | 1/1989 | Miklos | 43/19.2 |
| 4,807,386 A | | 2/1989 | Emory, Jr. | 43/27.4 |
| 4,901,970 A | | 2/1990 | Moss et al. | 248/514 |
| 4,928,420 A | | 5/1990 | Jackson | 43/27.4 |
| 4,948,083 A | * | 8/1990 | McNaney, Jr. et al. | 248/514 |
| 5,191,852 A | | 3/1993 | Rupp | 114/255 |
| 5,438,789 A | | 8/1995 | Emory | 43/21.2 |
| 5,445,102 A | | 8/1995 | Rupp | 114/255 |
| 5,761,844 A | * | 6/1998 | Horschel | 43/21.2 |
| 5,921,196 A | | 7/1999 | Slatter | 114/255 |
| 6,050,020 A | * | 4/2000 | Sizemore | 43/15 |

* cited by examiner

Primary Examiner—Charles T. Jordan
Assistant Examiner—Kimberly S. Smith
(74) Attorney, Agent, or Firm—Gifford, Krass, Groh, Sprinkle, Anderson & Citkowski, P.C.

(57) ABSTRACT

A fishing downrigger assembly secured to the stern of a boat for use with a fishing rod and reel during trolling. A substantially planar shaped base has a top face with an upwardly extending superstructure, a spaced apart bottom face defining therebetween a predetermined thickness, a front end and a rear end. An arm pivotally secures to the base along an axis defined therebetween and so that a substantially elongated portion of the arm extends substantially upwardly and forwardly from the base. A reel is rotatably secured to the superstructure, a cable extending from the reel and which is guided along the arm before terminating in a suspended weight. The reel further includes at least one line release clip located at a selected distance from the weight and which is capable of being engaged by the fishing reel. A catch mechanism is established between the base and the pivoting arm and actuates in a direction substantially parallel and offset relative to the pivotal axis. The catch mechanism includes a spring pin substantially hidden from view of the user, except for a pull knob, and which fixedly engages an abutting and rotating surface of said arm upon being actuated from a first extended and outboard position in which said weight is positioned at a selected depth beneath the boat to a second and inboard position.

19 Claims, 4 Drawing Sheets

TIP UP DOWNRIGGER ASSEMBLY WITH SAFETY CONFIGURED AND INBOARD POSITIONED CATCH PIN

BACKGROUND OF THE INVENTION

1. Field of the Invention

The present invention relates generally to fishing downrigger assemblies and, more particularly, to a downrigger assembly with multiple adjustment capability and incorporating a safety configured catch pin for locking the downrigger in an inboard position, as well as a caddy support retaining a downrigger weight ball in the inboard position.

2. Description of the Prior Art

Fishing downrigger assemblies are well known in the prior art. The purpose of a downrigger is to maintain the lure of a fishing line at a predetermined depth during trolling of a boat to which the downrigger and the fishing line is secured. Without the application of the downrigger, the fishing line would tend to skip along the surface of the water during trolling.

U.S. Pat. No. 4,610,409, issued to Emory, Jr., teaches a tip up rigger for trolling a fishing lure at a desired depth and includes an elongated arm consisting of a pair of substantially "L" shaped and elongated rods with free ends and opposite ends which is pivotally secured to a mounting base. A trolley is slidably mounted on the arm for movement towards and away from the free end of the arm. A downrigger line pulley is secured to the trolley for movement therewith and a downrigger line reel is mounted on the base with the line or cable extending over the downrigger pulley. An elastic cord has ends fixed to the trolley for biasing the trolley towards the free end of the arm and a latch is provided to secure the arm in a vertical or tipped up position. A pin extends through support blocks to pivotally mount the elongated rods making up the arm to the base. A latch is also supported on a selected support block and includes a hooked end configured to engage a latch pin extending between the rods and to maintain the rigger in its tipped up position.

A disadvantage encountered in the Emory, Jr. U.S. Pat. No. 4,610,409 reference is the configuration of the latch and pin which, while appearing to be effective to maintain the rigger in its tip up (or inboard) position tends also to pose a credible risk of injury to the unwary user who places his or her fingers in proximity to the latch pin. An additional problem is posed by the construction of the slidably mounted trolley in combination with the weight ball and which, when actuated to the tip up position illustrated in FIG. 5 of the '409 disclosure, poses safety concerns due to the unsecured nature of the weight ball.

U.S. Pat. No. 4,807,386, also issued to Emory, Jr., teaches a downrigger actuator which includes a downrigger motor for reeling in a downrigger line upon release of a fishing line or of a determined tension on the downrigger line. The device taught by the '386 reference includes a normally closed switch mounted on a fishing rod holder and engaged by the rod holder when the holder is in a set position. Upon movement of the rod holder from the set position to a strike position, the switch closes a circuit between a power source and downrigger motor and which is then actuated to reel in the downrigger line.

U.S. Pat. No. 4,798,021, issued to Miklos, teaches a downrigger which, when pulled through the water behind a boat, automatically and horizontally jigs a releasably-attached fishing line upon striking of a fish. The downrigger has a jigging line which is reeled in and pulled out of its housing. The housing includes a set of fins which bias the downrigger's "swimming" position relative to the point of attachment to the boat and so as to allow a number of downriggers to be used behind the boat without tangling of fishing or towing lines. Additional examples of prior art downrigger devices are also illustrated in Smith, U.S. Pat. No. 4,204,356, teaching an underwater fishing lure reciprocating device, and Emory, U.S. Pat. No. 4,205,478, teaching a multi-line fishing attachment.

SUMMARY OF THE PRESENT INVENTION

The present invention is a fishing downrigger assembly secured to the stern of a boat and for use with a fishing rod and reel during trolling. The downrigger of the present invention provides both a high degree of adjustability as well as incorporating a catch mechanism for safely and securely locking the extending downrigger arm in place when pivoted from an outboard to an inboard position. A particular feature of the downrigger assembly is the shaping of its several components to minimize the existence of pinch points and consequential injury to the user.

A substantially planar shaped base includes a top face with an upwardly extending superstructure and a spaced apart bottom face defining therebetween a predetermined thickness. The base further includes a forward end, upon which is configured a support housing for seating a trolling weight ball when the downrigger arm is actuated to the inboard position. An arcuate shaped portion of the arm pivotally secures to associated guide structure located at the rear end of the base and along an axis defined therebetween.

The catch mechanism established between the base and said pivoting arm includes a spring loaded pin which is recessed mounted within a selected column, hidden from view, and which is biased in a direction towards the pivotally interconnecting end of the downrigger arm. An arcuately shaped channel is formed in the pivot arm and includes a further recessed hole which seats the biased pin upon the arm being pivoted to the inboard position. A knob end of the spring loaded pin extends from an exterior surface of the first column and is actuated in a direction opposite that of the spring bias to unseat the pin from the further recessed hole and to facilitate the pivotal readjustment of the downrigger arm.

A reel is rotatably secured to the superstructure, with a cable extending from the reel which is guided along the arm and which terminates in the suspended weight. The reel also includes one or more line release clips located at selected distances from the weight, it being understood that the release clips engage the fishing reel of an associated fishing rod and act to release the reel upon sensing the striking of the line by a fish.

Additional features include the provision of a fishing rod support and which, in the preferred variant, includes one or more substantially flattened, elongated and crosswise extending members capable of being secured at locations proximate either or both the forward or rearward ends of the base. Each fishing rod support terminates at opposite ends in a pedestal, upon each of which is secured a rod holder in rotatably adjustable fashion. Each rod holder includes a further pivotally adjustable elbow connection which terminates in an upwardly extending fishing rod reception tube.

A turret assembly also extends from the bottom face of the base and permits the downrigger assembly to be rotatably adjustable about a vertical axis relative to the boat. The turret assembly includes a top plate secured to the bottom face of the base and which rotatably seats within a bottom plate secured to the stern rail of the boat. An additional spring biased pin is mounted within bottom plate and resecurably engages a selected one of a plurality of circumferentially arrayed engaging locations formed within a projecting collar of the top plate.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Reference now being had to FIGS. 1, 2, 5 and 6, the fishing downrigger assembly is shown at 10 according to the present invention and which is constructed so as to secure to a surface 12 of a boat, such typically being a suitable location along the stern rail and proximate the rear edge of the boat. A substantially planar shaped base 14 is provided which is constructed of a durable material, such as a lightweight steel or steel composite, and which includes a top surface 16 with an upwardly extending superstructure 18 and a spaced apart bottom face 20 defining a predetermined thickness-therebetween. The planar shaped base 14 further includes a forward end 22 and a rearward end 24.

Positioned in upwardly extending fashion at the forward end 22 is an annular projecting support housing 26 and which includes a plurality of circumferentially spaced apertures or gaps 28 formed therein. The purpose of the support housing 26, as will be subsequently described in greater detail, is to provide a seating location for a weight ball associated with the downrigger assembly and upon the downrigger assembly being actuated to a specified inboard position. A guide structure is also positioned at the rearward end 24 and includes a first column 30 and a second spaced apart column 32, the purpose for which will also be subsequently described in more detail.

An arm assembly is pivotally secured to the base 14 and includes a substantially elongated portion 34 and an interconnected and substantially arcuate shaped portion 36. The elongated portion 34 is further contemplated to be provided as first and second threadably interengaging subsections and as is illustrated by first subsection 38 having a first extending end 40 and a second opposite end 42 threadably engaging within a rotatable locking collar 44. A second subsection 46 includes a first end 48 threadably interengaging within an opposite side of the rotatably mounted locking collar 44 and a second opposite end 50 which likewise threadably interengages within an interiorly threaded channel in an opposing connector 52 defining an extending end of the arcuated shaped portion 36. The elongated portion 34 also includes a pair of reel guides 54 and 56 mounted at spaced apart locations corresponding to the extending end 40 of the first subsection 38 and an intermediate location along the second subsection 46 and between its opposing ends 48 and 50. The reel guides 54 and 56 are further constructed in a manner by itself known in the art, including rotatably supported channeling wheels, and the purpose for which being the ability to guidably receive and support a downrigger line or cable and associated accessories in suspended fashion from the downrigger. The threadably interengaging nature of the first and second subsections 38 and 46 of the elongated portion 34 are further such that the arm of the downrigger can be conveniently broken down for transport and/or storage. The arcuate shaped portion 36 of the arm is further illustrated as including, in the illustrated embodiment, a pair of first 58 and second 60 spaced apart and parallel arranged arcuate members which terminate in the extending end in the connector 52. A second end of the arcuate members 58 and 60 terminates in a mounting structure 62 which is configured to be pivotally secured in inserting fashion between the first and second guide columns 30 and 32 of the base 14. Apertures 64 and 66 formed cross wise through the first and second guide columns 30 and 32, respectively, align with a further cross wise extending aperture 68 extending within the mounting structure 62 and so that a pin 70 is inserted therethrough to pivotally secure the arm to the base. Referring also to the cutaway view of FIG. 4, a desired spacing 72 is illustrated between the mounting structure 62 of the arm and the opposing and spaced apart guide columns 30 and 32 and to facilitate the range of its pivotal motion.

Figures 1, 2:
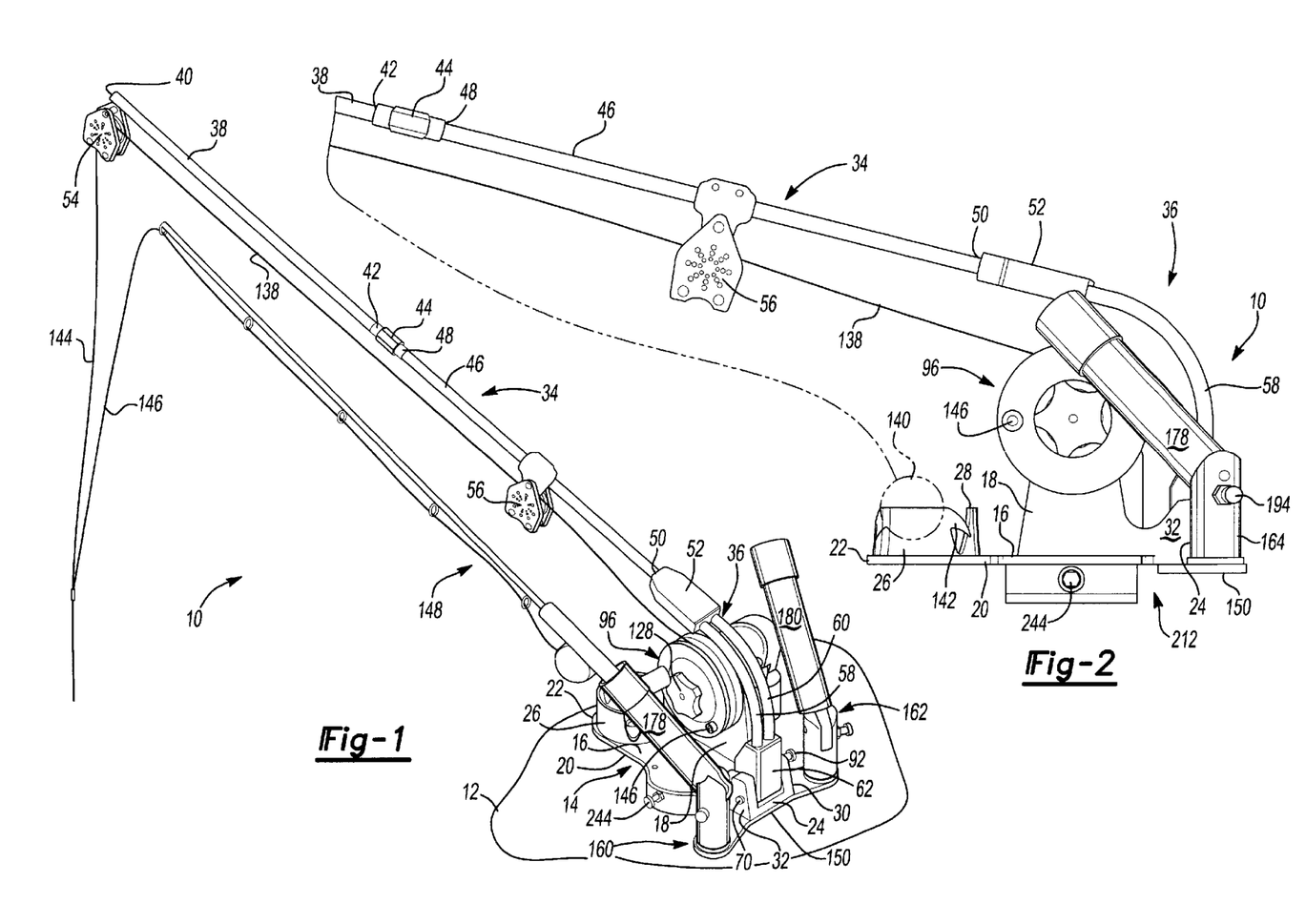
FIG. 1 is a perspective view of the downrigger assembly according to the present invention.
FIG. 2 is a substantially side plan view of the downrigger assembly illustrated in FIG. 1.
Figures 3, 4:
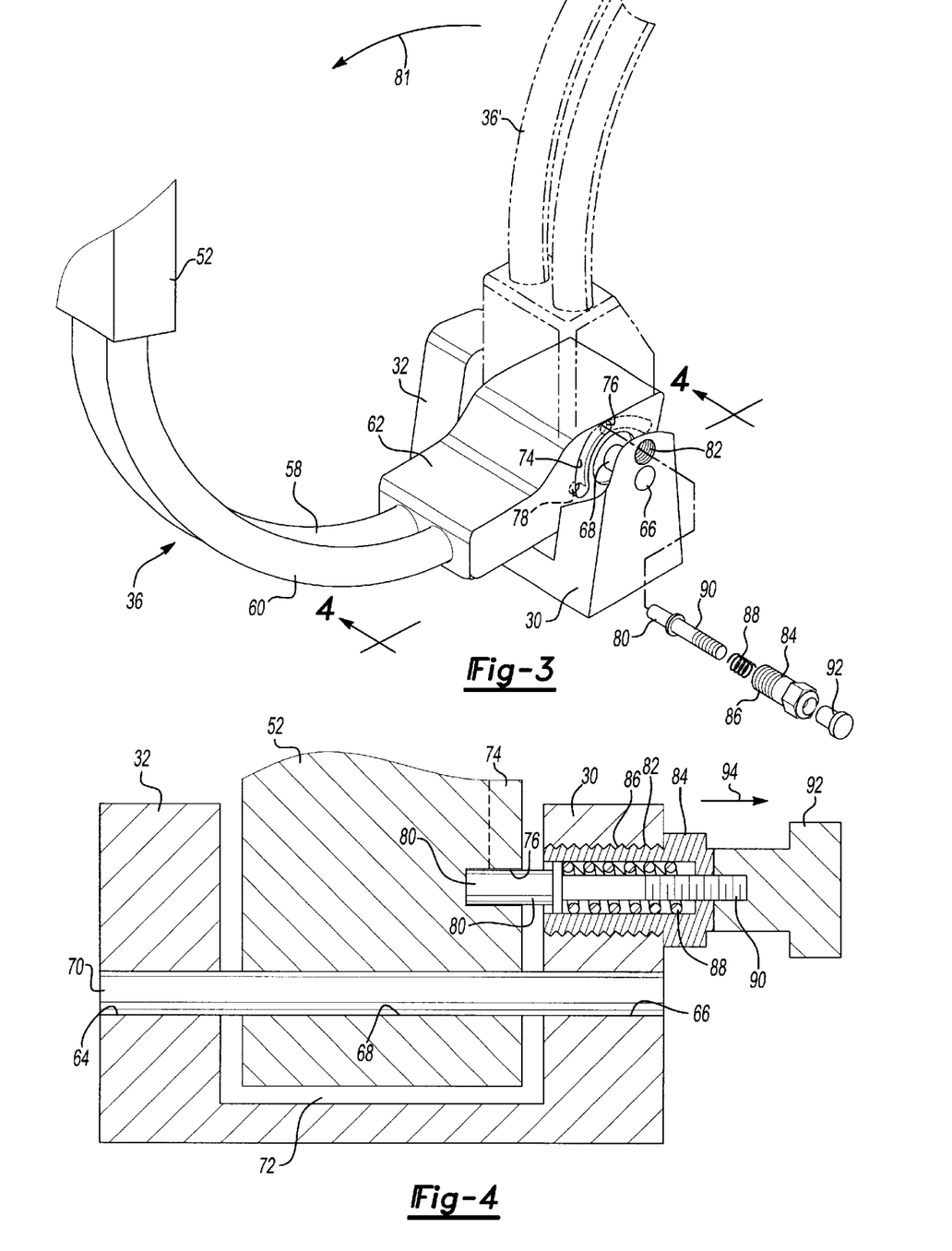
FIG. 3 is a partial view of the pivotal interconnection between the arcuate shaped portion of the downrigger arm and the associated guide structure of the base and further illustrating in cutaway the configuration of the catch mechanism for locking the arm in the inboard pivoted position.
FIG. 4 is a cutaway view taken along line 4—4 of FIG. 3 of the catch mechanism with spring loaded pin.
Figure 5:
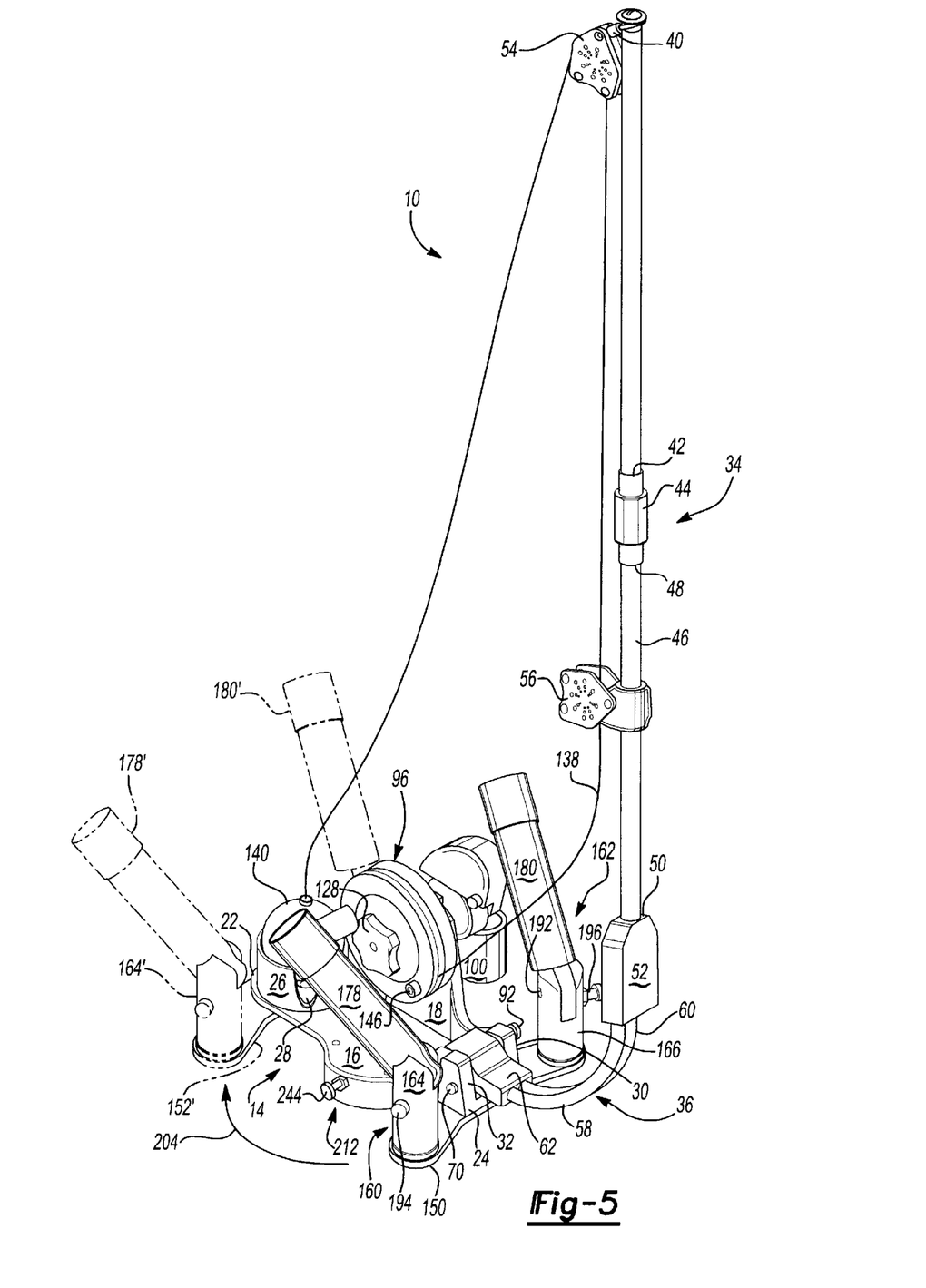
FIG. 5 is a perspective view of the downrigger assembly in the inboard position and further showing the adjustable nature of the rod supports.

Referring most specifically to FIGS. 3 and 4, a catch mechanism is illustrated for facilitating actuating of the pivoting arm from a first outboard position, such as illustrated in FIG. 1, to a second inboard position such as in FIG. 5. The catch mechanism includes an arcuate shaped channel 74 formed in a face of the mounting structure 62 in opposing fashion to the second guide column 32. Defined within the arcuate channel 74, typically at an intermediate location, is a further recessed hole 76. An additional hole may optionally be positioned at 78 as illustrated.

The catch mechanism further includes a spring loaded pin 80 extending through a further selected aperture 82 defined in cross wise fashion through the first column 30 and in offset and parallel translating fashion with respect to the pivotal axis defined by the pin 70 and aligning apertures 64, 66 and 68. The spring pin 80 is biased in a direction towards and within the arcuate shaped channel 74 and is translatable along the channel 74 during pivoting of the arm with respect to the base 14. As illustrated in FIG. 3, the arm pivots from the outboard position (in which the arcuate shaped portion is illustrated in phantom 36') in a direction along arrow 81 to where the arcuate shaped portion is illustrated at 36 and the pin 80 seats within the recessed hole 76 in the inboard position.

The catch mechanism further includes an interiorly hollowed collar 84, an exterior surface of which is threaded (at 86) and rotatably interengageable with the threads placed within said further selected aperture 82 in the first column 30. A coil spring 88 seats within the hollowed interior of said collar 84 (see cutaway of FIG. 4). A stem 90 integrally connected to the inserting spring pin 80 inserts through the hollowed interior of the collar 84 and the coil spring 88 and, at an end opposite the pin 80, secures to a knob end 92 which extends from an exterior surface the first column 30. As illustrated best in FIG. 4, actuation of the knob end 92 in a direction opposite that of the spring bias, and as is illustrated by directional line 94, unseats the pin 80 from the recessed hole 76 to permit pivotal readjustment of the arm.

A reel 96 is provided and which is constructed preferably of an injection molded plastic. In the preferred variant, the reel 96 includes first and second annular shaped and smooth exterior faces. The configuration of the reel 96 with the smooth faces, as opposed to the formation within the reel of material saving apertures, is intended as a safety feature top prevent injury to a user's hands. The reel 96 includes an integrally formed collar 98 (see exploded view of FIG. 6 and which illustrates a sectioned end 99 in spaced fashion) which is secured to the superstructure 18.

An electric motor 100 drives the reel 96 through an aperture 102 in the superstructure 18. The motor 100 is supported upon a housing 104 fastened to the superstructure by first 106, second 108 and third 110 standoffs which are internally threaded at exposed end. First, second and third fasteners (illustrated in FIG. 6 by fastener 112) engage through associated apertures 114, 116 and 118 on an opposite face of the superstructure 14 to mount the motor 100 and housing 104. An extending and rotating drive shaft 120 from the motor 100 inserts through the aperture 102 in the superstructure and an aligning and associated aperture 122 in the collar 98 and integrally formed reel 96. An exposed end of the shaft 120 receives a pin 124 in cross wise extending fashion through an aperture 126 in the shaft 120 and, upon assembly, securably mounts the reel 96 to the rotating drive shaft 120.

Additional structure for mounting the reel 96 in rotatable fashion upon the base superstructure 18 include a tightening knob 128 with an internally threaded recessed interior and which rotatably engages over an exteriorly threaded end 130 of the drive shaft 120. Sandwiched therebetween is the pin 124 which engages the shaft aperture 126, the pin 124 in turn seating within a configured portion 132 defined within a disk 134, the disk 134 in turn dropping into an annular recess 136 defined within a facing surface of the reel 96 and so that the reel is rotatably engaged.

A cable 138 is wound upon and extends from the reel 96, with an innermost wound end being secured to an apertured portion 140 in the reel 96 and so that, upon an entire unwinding of the cable 138, it is prevented from disconnecting from the reel 96. The cable is guided along said arm by the guides 54 and 56 and terminates in a suspended weight 140. The suspended weight 140 is according to a construction known in the art and may include one or more wings 142 (see FIG. 2). The apertured configuration 28 of the support housing 26 facilitates the seating of the weight in the inboard position. Positioned along the cable 138 is at least one line release clip 144 (FIG. 1) and which is located at a selected distance from weight 140 and to which is engaged a fishing reel line 146 of a standard fishing rod 148. As is known in the relevant art, the line release clip 144 is configured to release the fishing reel 146 upon a fish striking a fish bait (not shown) secured to the reel 146.

A fishing rod support is provided for supporting at least one fishing rod 148 to the downrigger base 12 and at either or both the forward and rearward ends of the base. In a preferred variant, the rod support further includes a substantially flattened, elongated and crosswise extending member 150 having first 152 and second 154 elevated and pedestal surfaces at associated first and second opposite ends. The pedestals 152 and 154 each include a plurality of four upwardly projecting and spaced apart engaging nubs 156 and 158, respectively. First 160 and second 162 adjustable rod holders are secured upon the first 152 and second 154 pedestals.

Each of the first and second rod holders 160 and 162 include a support column engageable upon the associated pedestal 152 and 154. Specifically, support column 164 engages upon pedestal 152 and support column 166 engages upon pedestal 154. Referring again to the exploded view of FIG. 6, the second support column is illustrated with a circumferential array of nub recesses 168 defined in its bottom surface, a selected four of which receive in seating fashion the four spaced apart nubs 158 projecting from the pedestal 154. A screw 170 extends within an axially extending aperture 172 in the support column 166 and aligning aperture 174 in the pedestal 154 to selectively and adjustably secure the support column in a selected rotatable position relative to the rod support, and which is illustrated by the rotational directional arrow 176 in reference to the other corresponding support column 164 and about a vertical axis. Both support columns 164 and 166 are constructed identically, therefore a repetitive description of the corresponding structure of the first support column 164 is not required.

Figure 6:
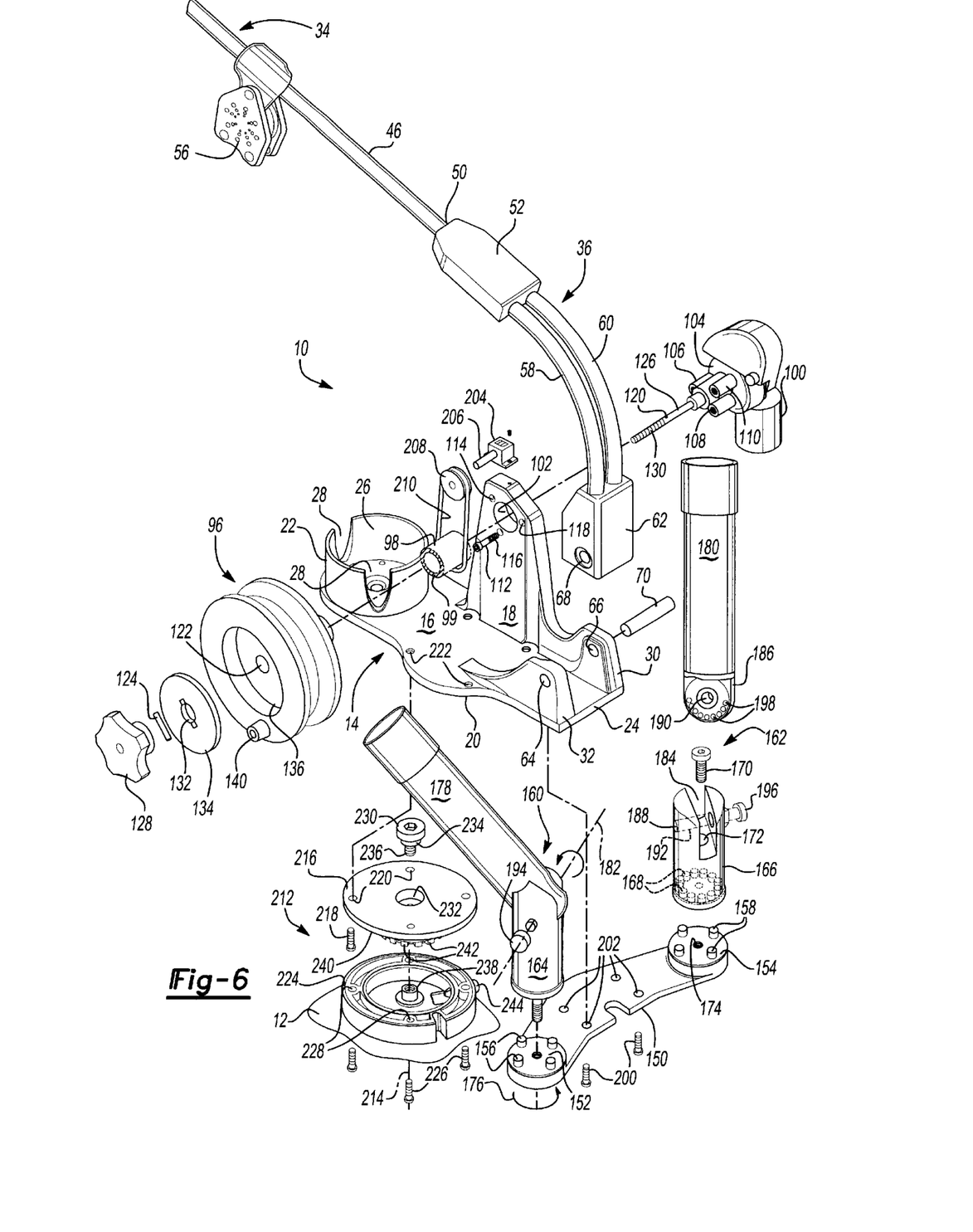
FIG. 6 is an exploded view of the downrigger assembly according to the present invention.

Rod reception tubes 178 and 180 are secured, via pivoting elbow connections, to the first and second support columns 164 and 166, respectively, and which permit an upwardly arrayed rod reception tube to be adjusted about a horizontal axis 182 (see rod reception tube 178 in FIG. 6). As is clearly illustrated in FIG. 1, the rod reception tubes configured to receive in axially inserting fashion a handle end of a fishing rod and as is again illustrated by fishing rod 148. Each of the rod holder support columns 164 and 166, and as is illustrated again in the exploded view of FIG. 6 with regard to second support column 166, further includes an axially extending channel 184 within which seats an associated end 186 of the second rod reception tube 180. Aligning apertures 188 and 190 in the second support column 166 and associated reception tube 180 receive a pin 192 therethrough to define the pivoting elbow connection.

Spring loaded pins 194 and 196 are again provided for both the first and second rod holders 160 and 162 and are constructed with components similar to that previously described in reference to the spring pin 80. The spring pins 194 and 196 extend in cross wise and parallel spaced apart fashion with respect to the pin defining the associated elbow connection. The pins 194 and 196 extend through the apertures formed in the associated support columns, as again referenced by aperture 184 in the support column 166 of FIG. 6, and seat within a selected one of a plurality of recesses (see at 198 in FIG. 6) defined in arcuate arrayed fashion upon an opposing and lower most end surface of the associated rod reception tube 180. The spring pins, such as spring pin 196 associated with the rod reception tube 180, is withdrawn from a selected recess 198 by exerting an opposite bias to the spring bias. The tube 180 is then pivoted in the direction previously illustrated along horizontal axis 182 before the pin (196) is allowed to reseat within a further selected aperture 198. The rotatable adjustment of the support columns 164 and 166 about the vertical axis, in combination with the likewise rotatable adjustment of the rod reception tubes 178 and 180 about the horizontal axes defining the elbow connections with the support columns, provide in combination a universal adjustment capability for repositioning the fishing rod in an desired fashion upon the rod support.

Referring again to FIG. 6, a plurality of fasteners 200 (typically four) engage through associated apertures 202 defined within the cross wise extending member 150 and engage additional aligning apertures (not shown) defined in the base 14 and proximate the rear end 24. As is further shown in phantom in FIG. 5, the extending member 150 (or an additional and identical such extending member illustrated in phantom 150' along with rod reception tubes 178' and 180' and illustrated support column 164' pivotally associated with the first rod reception tube 178') may be secured to the bottom face 20 of the base 14 at the forward end 22. In this fashion, it is contemplated that either two or four fishing rods can be employed at the same time with the downrigger assembly, such as by the provision of a corresponding number of line release clips at selected depths along the downrigger cable.

To determine an appropriate depth of the downrigger cable 138, a counter mechanism (see FIG. 6) is operably engaged to the fishing reel 96 and includes a unit 204 secured to a top surface of the superstructure 18. A pin 206 extends from the counter mechanism and is rotatably driven by a pulley 208 secured to an end of the pin 206. A looping spring belt 210 engages both the pulley 208 and a selected location of the reel 96 (such as about the integrally formed collar 98) to increment or decrement the reading (typically in feet or meters) indicated by the counter mechanism unit 204 and which is dictated by the direction of the cable 138.

A turret assembly 212 extends from the bottom face 20 of the base 14 and permits the downrigger assembly to be rotatably adjustable about a vertical axis 214 (FIG. 6) relative to the boat 12. As best shown in exploded fashion in FIG. 6, a top plate 216 is secured to the bottom face 20 of said planar shaped base 14, such as by fasteners 218 which engage in upwardly directed fashion through threaded apertures 220 in both the top plate 216 and in aligning fashion in the base (at 222). A bottom plate 224 secures to the boat 12 such as again through the use of additional screw fasteners 226 which likewise engage in underside inserting fashion through a horizontal mounting surface of the boat (again such as the stern rail) and through apertures 228 defined in the bottom plate 224.

The top plate 216 is seatingly engaged with the bottom plate 224 so that the top plate 216 and the supported downrigger is rotatably and swivelably adjustable relative to the bottom plate 224. A fastener 230 includes a smooth faced and annular stepped configuration from which extends a downwardly threaded shaft. The fastener 230 inserts through a central hole 232 in the top plate 216 so that the annular step 234 of the fastener engages downwardly against an upper surface of the top plate 216. Shaft end 236 threadably engages within an upwardly facing and internally threaded support 238 defined substantially centrally within the face of the bottom plate 224 and so that the top plate 216 is seatingly engaged thereupon.

The top plate 216 is resecurably engaged to in rotatably adjustable fashion to the bottom plate 224 by a cylindrical shaped collar 240 which projects from the downwardly facing and seatingly engaging face of the top plate 216. As best shown in the view of FIG. 6, a plurality of circumferentially arrayed engaging locations are formed in annular extending fashion around the collar 240 (see at 242) and according to one preferred embodiment are arranged at respective 45° angular increments.

A spring biased pin 244 extends through an aperture formed in a side wall of the bottom plate 224, the pin 244 being constructed substantially identically to the spring pin structure previously referenced at 80, and so that the inwardly biased spring end seats within a selected one of the plurality of circumferentially arrayed engaging locations 242. The pin 244 is again capable of being selectively withdrawn from the selected engaging location 242, so that the top plate 216 and supported downrigger may then be rotatably readjusted before the pin 244 reseats within a further selected engaging location.

Having described my invention, it is evident that it teaches an extremely user friendly downrigger assembly which is adjustable along a number of different axes. The downrigger assembly also provides an ease of operation in actuating the pivoting arm to the inboard position, whereupon the catch mechanism clicks in place to fixedly engage the arm. The configuration of the exterior surfaces of the downrigger is further an improvement over the prior art in that it provides a plurality of pinch free locations to prevent inadvertent injury to the user. The construction of the catch mechanism with arcuate shaped channel in the guide column, combined with the recessed and hidden nature of the spring pin, provides an extra degree of safety and improvement over prior art devices in which the latching structure between the pivot arm and base is exposed and may tend to cause injury to the user's hands.

Additional preferred embodiments will become apparent to those skilled in the art to which it pertains, and without deviating from the scope of the appended claims:

We claim:

1. A fishing downrigger assembly secured to the stern of a boat for use with a fishing rod and reel during trolling, said downrigger assembly comprising:

a substantially planar shaped base having a top face with an upwardly extending superstructure and a spaced apart bottom face defining therebetween a predetermined thickness, said base further comprising a forward end and a rearward end, a support housing being formed at said forward end;

an arm pivotally securing to said base along an axis defined therebetween and so that a substantially elongated portion of said arm extends substantially upwardly and forwardly from said base;

a reel rotatably secured to said superstructure, a cable extending from said reel which is guided along said arm and which terminates in a suspended weight, said reel including at least one line release clip located at a selected distance from said weight and which is capable of being engaged by the fishing reel; and a catch mechanism established between said base and said pivoting arm, said catch mechanism actuating in a direction substantially parallel and offset relative to said pivotal axis and fixedly engaging said arm upon being actuated from a first extended and outboard position in which said weight is positioned at a selected depth beneath the boat to a second and inboard position in which said support housing seats said weight.

2. The fishing downrigger assembly as described in claim 1, said arm further comprising an arcuate shaped portion which interconnects with said elongated portion at a first end, said arcuate shaped portion including a second end pivotally securing with said base.

3. The fishing downrigger assembly as described in claim 2, said base further comprising a guide structure including a first column and a second spaced apart column, said columns receiving therebetween said pivotally securing end of said arcuate shaped portion, a pin inserting through aligned apertures defined in said spaced apart columns and said arcuate shaped portion to define said pivotal axis.

4. The fishing downrigger assembly as described in claim 3, said catch mechanism further comprising:

an arcuate shaped channel formed in said arcuate shaped portion at said pivotally securing end and in opposing fashion to an abutting surface of said first column, a further recessed hole being formed within said arcuate shaped channel at a selected location;

a spring loaded pin extending through a further selected aperture defined in said first column in offset and parallel translating fashion with respect to said pivotal axis, said pin being biased in a direction towards said arcuate shaped channel and translatable along said channel during pivoting of said arm with respect to said base, said pin seating within said further recessed hole upon said arm being actuated to said inboard position; and a knob end of said spring loaded pin extending from an exterior surface said first column and being actuated in a direction opposite that of said spring bias to unseat said pin from said further recessed hole.

5. The fishing downrigger assembly as described in claim 4, said pin further comprising:

an interiorly hollowed collar, an exterior surface of said collar being threaded and rotatably interengageable with threads placed within said further selected aperture in said first column;

a coil spring seating within said hollowed interior of said collar; and a stem inserting through said hollowed interior of said collar and said coil spring, a first end of said stem securing to a seating portion of said pin, a second end of said stem securing to said knob end.

6. The fishing downrigger assembly as described in claim 2, said elongated portion including first and second threadably engaging subsections, said first end of said arcuate shaped portion threadably engaging with an associated and opposing end of said second subsection.

7. The fishing downrigger assembly as described in claim 1, further comprising a fishing rod support for at least one fishing rod, said support being secured to at least one of said forward and rearward ends of said base.

8. The fishing downrigger assembly as described in claim 7, said rod support further comprising:

a substantially flattened, elongated and crosswise extending member having first and second pedestals at associated first and second opposite ends;

a first adjustable rod holder secured upon said first pedestal and a second adjustable rod holder secured upon said second pedestal, said first and second rod holders each further comprising an elbow connection for permitting an upwardly arrayed rod reception tube to be adjusted about a horizontal axis; and each of said rod holders further comprising a downwardly arrayed support columns capable of being rotatably supported upon said associated pedestal about a vertical axis.

9. The fishing downrigger assembly as described in claim 8, each of said rod holder support columns further including an axially extending channel within which seats an associated end of said rod reception tube, aligning apertures in said support columns and associated reception tubes receiving a pin therethrough and defining said elbow connection.

10. The fishing downrigger assembly as described in claim 9, further comprising a spring loaded pin extending in cross wise fashion through an aperture formed in each support column, in communication with said channel, and seating within a selected one of a plurality of recesses defined in arcuate arrayed fashion upon an opposing surface of said associated rod reception tube and for permitting selective readjustment of said rod reception tube about said horizontal axis.

11. The fishing downrigger assembly as described in claim 1, further comprising an electric motor for driving said reel, said motor being supported upon a housing fastened to said base superstructure and including an extending and rotating drive shaft which inserts through a central aperture in said reel, an exposed end of said shaft receiving a pin in cross wise extending fashion to securably mount said reel to said rotating drive shaft.

12. The fishing downrigger assembly as described in claim 11, further comprising a depth counter mechanism operably engaged to said reel.

13. The fishing downrigger assembly as described in claim 12, said depth counter mechanism further comprising a pin extending therefrom and which is rotatably driven by a pulley secured to an end of said pin, a looping spring belt engaging said pulley with a selected location of said reel.

14. The fishing downrigger assembly as described in claim 1, further comprising a turret assembly extending from said bottom face of said base, said turret assembly permitting said downrigger assembly to be rotatably adjustable about a vertical axis relative to the boat.

15. The fishing downrigger assembly as described in claim 14, said turret assembly further comprising:

a top plate secured to said bottom face of said planar shaped base;

a bottom plate secured to the boat, said top plate seatingly engaging with said bottom plate and so that said top plate and said supported downrigger is rotatably adjustable relative to said bottom plate; and means for resecurably engaging said top plate to said bottom plate at selected rotated locations.

16. The fishing downrigger assembly as described in claim 15, said means for resecurably engaging said top plate to said bottom plate further comprising:

a cylindrical shaped collar projecting from a seatingly engaging face of said top plate, a plurality of circumferentially arrayed engaging locations being formed in annular extending fashion around said collar;

a spring biased pin extending through an aperture formed in a side wall of said bottom plate, said pin seating within a selected one of said plurality of arrayed engaging locations, said pin being selectively withdrawn from said selected engaging location, said top plate and supported downrigger being rotatably readjusted before said pin reseats within a further selected engaging location.

17. The fishing downrigger assembly as described in claim 16, each of said circumferentially arrayed engaging location of said seating collar extending at respective 45° angular increments.

18. The fishing downrigger assembly as described in claim 1, said reel further comprising first and second smooth and outer faces, a wire curl hole being formed through a selected face of said reel and to which is engaged an end of said cable.

19. A fishing downrigger assembly secured to the stem of a boat for use with a fishing rod and reel during trolling, said downrigger assembly comprising:

a substantially planar shaped base having a top face with an upwardly extending superstructure and a spaced apart bottom face defining therebetween a predetermined thickness, said base further comprising a guide structure including a first column and a second spaced apart column;

an arm pivotally securing to said base along an axis defined therebetween and so that a substantially elongated portion of said arm extends substantially upwardly and forwardly from said base, said arm further comprising an arcuate shaped portion which interconnects with said elongated portion at a first end, said arcuate shaped portion including a second end pivotally securing between said spaced apart columns of said base, a pin inserting through aligned apertures defined in said spaced apart columns and said arcuate shaped portion to define said pivotal axis;

a reel rotatably secured to said superstructure, a cable extending from said reel which is guided along said arm and which terminates in a suspended weight, said reel including at least one line release clip located at a selected distance from said weight and which is capable of being engaged by the fishing reel; and a catch mechanism established between said base and said pivoting arm, said catch mechanism actuating in a direction substantially parallel and offset relative to said pivotal axis and fixedly engaging said arm upon being actuated from a first extended and outboard position in which said weight is positioned at a selected depth beneath the boat to a second and inboard position;

said catch mechanism further comprising:

an arcuate shaped channel formed in said arcuate shaped portion at said pivotally securing end and in opposing fashion to an abutting surface of said first column, a further recessed hole being formed within said arcuate shaped channel at a selected location;

a spring loaded pin extending through a further selected aperture defined in said first column in offset and parallel translating fashion with respect to said pivotal axis, said pin being biased in a direction towards said arcuate shaped channel and translatable along said channel during pivoting of said arm with respect to said base, said pin seating within said further recessed hole upon said arm being actuated to said inboard position; and a knob end of said spring loaded pin extending from an exterior surface of said first column and being actuated in a direction opposite that of said spring bias to unseat said pin from said further recessed hole.

* * * * *